US010295402B2

(12) United States Patent
Mercier et al.

(10) Patent No.: US 10,295,402 B2
(45) Date of Patent: May 21, 2019

(54) OPTICAL CORRELATION FOR DETECTION OF POINT SOURCE OBJECTS

(71) Applicant: BAE Systems Information And Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 286 days.

(21) Appl. No.: 14/918,233

(22) Filed: Oct. 20, 2015

(65) Prior Publication Data

US 2016/0109288 A1 Apr. 21, 2016

Related U.S. Application Data

(60) Provisional application No. 62/066,428, filed on Oct. 21, 2014.

(51) Int. Cl.
  *G01J 1/18* (2006.01)
  *G01J 1/42* (2006.01)
  *G01J 1/02* (2006.01)

(52) U.S. Cl.
  CPC .............. *G01J 1/18* (2013.01); *G01J 1/0219* (2013.01); *G01J 1/4228* (2013.01); *G01J 2001/4247* (2013.01)

(58) Field of Classification Search
  None
  See application file for complete search history.

(56) References Cited

U.S. PATENT DOCUMENTS

| 2005/0190987 A1* | 9/2005 | Schulz ................ G02B 5/005 382/291 |
| 2007/0125951 A1* | 6/2007 | Snider ................ G06K 9/00771 250/363.03 |
| 2009/0121925 A1* | 5/2009 | Scott ...................... G01S 3/784 342/195 |

* cited by examiner

*Primary Examiner* — Herve-Louis Y Assouman
(74) *Attorney, Agent, or Firm* — McCarter & English LLP

(57) ABSTRACT

A method of determining the point source quality of a set of pixels associated with a detected energy signature is discussed that pre-records ideal test point source signatures at various sub-pixel locations and radiant intensities throughout the overall sensor field of view in a focal plane array, determines the sub-pixel location of an observed source, and compares the signature at a pixel of the observed source to the pre-recorded "ideal source" signatures at the determined sub-pixel location. to determine point source correlation.

17 Claims, 8 Drawing Sheets

Observed
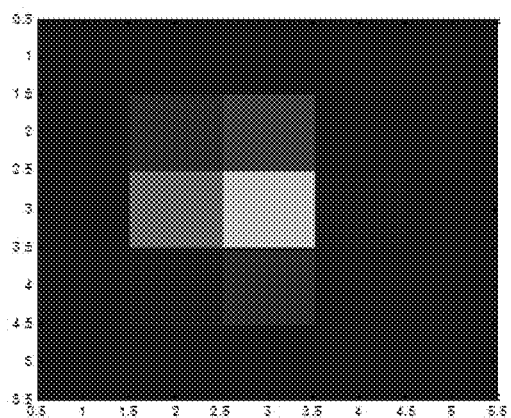
Ideal
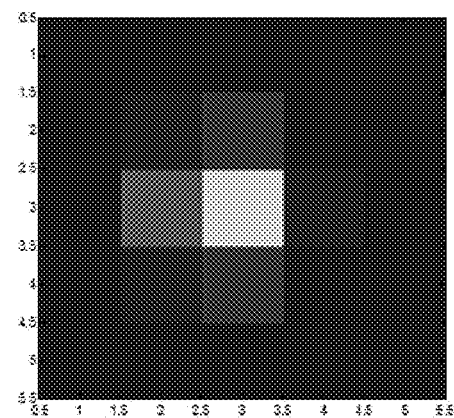
FIG. 3A
FIG. 3B

OPTICAL CORRELATION FOR DETECTION OF POINT SOURCE OBJECTS

RELATED APPLICATION

This application claims benefit of and priority to U.S. provisional application Ser. No. 62/066,428, filed Oct. 21, 2014, which is incorporated herein by reference in its entirety.

BACKGROUND

One use of optical sensors in a military setting is to detect and counter a launched ordnance as part of a threat detection system. Nearly all launched ordnances emit a concentrated "point source" energy signature that physically occupies less than one pixel or less of image data, but is blurred into multiple pixels when observed by sensors, rather than a larger "extended source" energy signature that occupies multiple pixels of image data. This characteristic of a concentrated energy signature is used, among others, to differentiate threats from benign objects.

SUMMARY in one embodiment, a method for identifying a point source energy signature is disclosed. The method includes receiving a test point source energy signature corresponding to a number of sub-pixel locations in one or more pixels of image data generated from within a field of view of at least one sensor. The method also includes calculating and storing an ideal energy value for each of the sub-pixels within the field of view based on an intensity value of the test point source energy signature at the sub-pixel locations. The method also includes receiving an observed energy signature within a first pixel of the one or more pixels. The method also includes calculating an observed energy value for the first pixel based on the observed energy signature. The method also includes determining a sub-pixel location for the observed energy signature within the first pixel. The method also includes comparing the observed energy value for the first pixel against a stored ideal energy value for a sub-pixel location that corresponds to the determined sub-pixel location for the observed energy signature within the first pixel. The method also includes determining whether the observed energy signature correlates to a point source based on the comparing.

In another embodiment, a system for identifying a point source energy signature is disclosed. The system includes a focal plane array configured to receive a test point source energy signature corresponding to a number of sub-pixel locations in one or more pixels of image data generated from within a field of view of at least one sensor. The focal plane array is also configured to receive an observed energy signature within a first pixel of the one or more pixels. The system also includes one or more processors configured to calculate and store an ideal energy value for each of the sub-pixels within the field of view based on an intensity value of the test point source energy signature at the sub-pixel locations. The one or more processors are also configured to calculate an observed energy value for the first pixel based on the observed energy signature. The one or more processors are also configured to determine a sub-pixel location for the observed energy signature within the first pixel. The one or more processors are also configured to compare the observed energy value for the first pixel against a stored ideal energy value for a sub-pixel location that corresponds to the determined sub-pixel location for the observed energy signature within the first pixel. The one or more processors are also configured to determine whether the observed energy signature correlates to a point source based on the comparing.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A shows an observed point source energy signature, according to an exemplary embodiment of the present invention.

FIG. 3B shows an ideal point source energy signature, according to an exemplary embodiment of the present invention.

DETAILED DESCRIPTION

Figure 1:
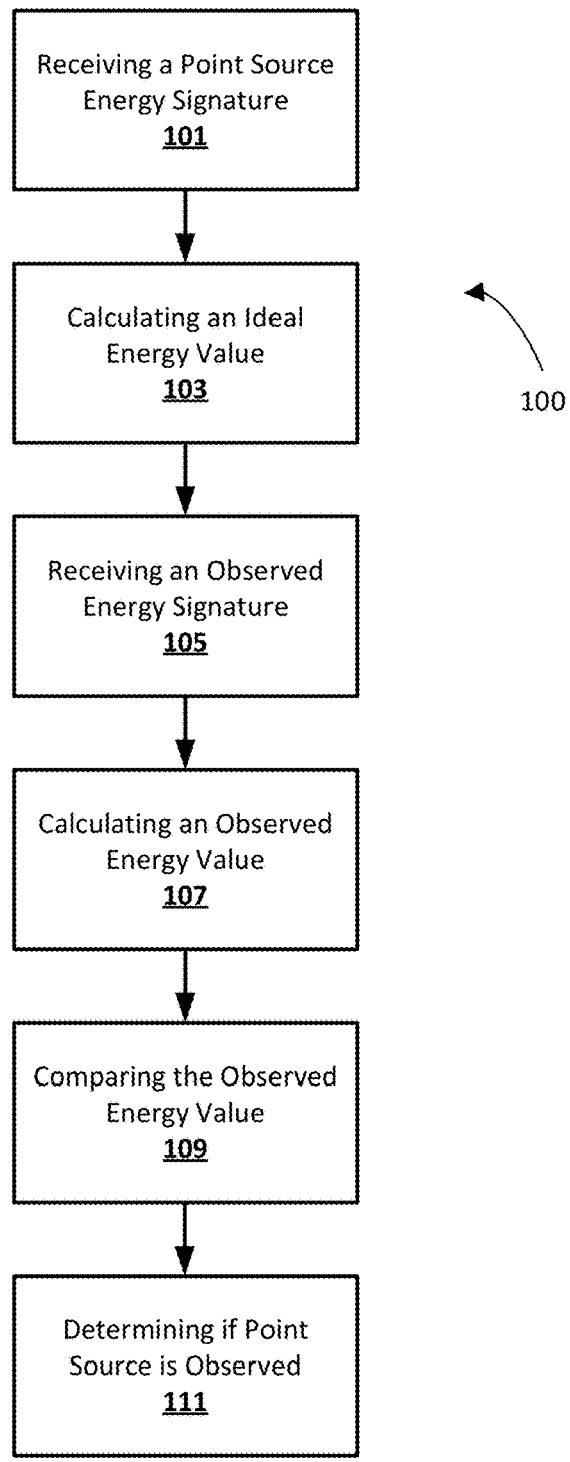
FIG. 1 is a flow chart illustrating a method for identifying a point source energy signature, according to an exemplary embodiment of the present invention.

According to exemplary embodiments of the present invention, systems and methods for identifying a point source energy signature and determining a point source quality of a set of pixels in image data are disclosed.

Differentiating benign detections from threats is critical to achieving maximum protection of a host platform, such as, but not limited to, a helicopter, airplane or drone, because processing limitations and response times dictate that a threat detection system minimize false detections and accurately identify the type of actual threats being detected. In general, the detection of a "point source" energy signature by a focal plane array (FPA) can be difficult, as point sources are often smaller than a single pixel in the image data captured by the sensors in the FPA and due to optical blurring and high intensity, may emit sufficient radiant energy that the signature extends over multiple pixels in acquired image data. This sometimes leads to a blurring effect that causes point sources to appear similar to extended sources. Traditional methods of differentiating these sources rely on this optical blur, but typically do not account for variances in the optical blur over the field of view of the sensor.

In one exemplary embodiment, a subpixel blur of a point source is mapped through the camera optics onto a focal plane into a database. More particularly, a test point source is moved through the Field of View (FOV) of one or more sensors to each pixel and subpixel location and the normalized values of the intensity in the surrounding pixels is recorded. These intensity values from the test point source are referred to herein as "ideal" intensity values and ideal point source signatures herein. The percentage of the total energy in the surrounding pixels will vary based on the optics blur but may encompass >90% of the total energy incident on the FPA. As used herein, an FPA is an image sensing device including an array of light-sensing pixels at the focal plane of a lens, where light is typically defined as any electromagnetic radiation from ultraviolet through long wave infrared. This recorded [coverage] is used to determine a point spread function of the optics as a function of pixel and subpixel location on the focal plane array. While this point spread function may be Gaussian, it may also be stretched out near the edges of the FOV or have even more complex patterns due to uncorrected optical aberrations of the sensors. Subsequently, for an observed signature that may be a potential point source, an approximate subpixel location for an observed signature is determined using a center of mass calculation on the intensity of the surrounding pixels. The pixel intensity of the surrounding pixels is compared to the normalized intensity for ideal point source signatures for that pixel and subpixel location that have been previously stored in the database. In effect, the pixel and sub-pixel location of the observed signature are used to index into a database of ideal point source signatures to get the expected values of local pixels for a recorded ideal point source signature. A high correlation indicates the observed signature at that pixel is a real point source. For the comparison, in one embodiment, a linear best-fit curve can be applied to the data, wherein a slope approaching a value of one indicates a higher probability that the observed energy source is a point source. In alternative embodiments, a low $R^2$ value, or coefficient of determination, indicates a higher probability that the observed source is a point source.

FIG. 1 is a flow chart illustrating a method 100 for identifying a point source energy signature, according to an exemplary embodiment of the present invention. In step 101, a test point source energy signature is received at one or more sensors in an FPA. In exemplary embodiments, the sensors may include infrared sensors suitable for detecting a heat signature of, for example, a launched missile or other ordnance. The point source may be smaller than the size of a single pixel in image data generated from the received sensor data, and a point source energy signature can be received at various sub-pixel locations within pixel locations throughout the FPA sensor's FOV. For example, a pixel may be divided into a 5×5 grid having 25 individual sub-pixels, and a test point source energy signature can be received at each sub-pixel location within each pixel within a FOV. It will be appreciated that in other embodiments, the pixels may be divided in a different fashion other than a 5×5 grid. For example, in one embodiment, each pixel may be divided into quadrants or into a 3×3 grid. In exemplary embodiments, the dimensions of the sub-pixel grid can be determined based on the desired accuracy of the system, and/or the amount of database memory available to the system. In step 103, an ideal energy value is calculated for the pixels, In some embodiments, an individual ideal energy value, or ideal energy content, can be calculated when the test point source signature is located at each sub-pixel location within each pixel. A test point source signature located at or near the edge of one pixel can create a blurring effect on adjacent pixels, and therefore impact the ideal energy value of adjacent pixels by increasing the energy value of the adjacent pixel. In step 105, following the calculation and recording of the ideal energy values based on the test point source signature, an observed energy signature is received at one or more sensors in the FPA. As described above, the sensors may be infrared sensors. In exemplary embodiments, a sub-pixel location may be determined for the observed energy signature. In one embodiment, an approximate sub-pixel location for the observed signature is determined using a center of mass calculation on the intensity of the surrounding pixels. In step 107, an observed energy value is calculated for the pixels within the FOV once the observed energy signature is received. As noted, an observed energy signature within one pixel may alter the observed energy signature of adjacent pixels. In step 109, the observed energy values of pixels calculated in step 107 are compared against the ideal energy values calculated in step 103. In exemplary embodiments, the comparison of the observed energy values against the ideal energy values allows a determination to be made by a point source detection system as to whether the observed energy signature corresponds to a point source. In exemplary embodiments, when the sub-pixel location of the observed energy signature is determined in step 105, the observed energy value of the pixel containing the observed energy signature is compared against the ideal energy value corresponding to the sub-pixel location of the observed energy signature. In step 111, whether the observed energy signature is from a point source is determined, based on the comparison completed in step 109. In one embodiment, the comparison may include plotting the observed energy values for pixels within a sensor FOV against the ideal energy values corresponding to the pixels. A linear best-fit curve may be applied to such a plot, and a slope approaching one can indicate a higher likelihood that the observed energy signature corresponds to a point source.

Figure 2A:
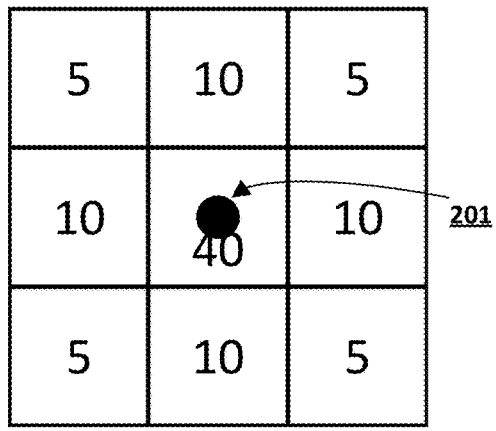
FIG. 2A shows an energy value distribution for a grid of nine pixels where a point source is observed at the center pixel, according to an exemplary embodiment of the present invention.

FIG. 2A shows an energy value distribution for a grid of nine pixels, where a point source 201 is observed at the center pixel, according to an exemplary embodiment of the present invention. In this particular embodiment, because the energy value distribution is greatest at the center pixel, with a value of 40, and the adjacent pixels have equally distributed energy values, it can be concluded that the point source 201 has been detected at the center-most sub-pixel value of the center pixel.

Figure 2B:
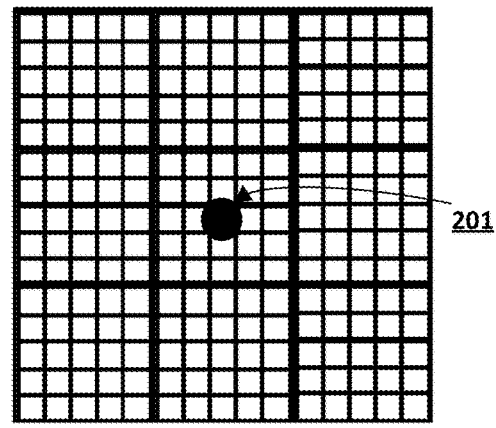
FIG. 2B shows the sub-pixel location of the point source of FIG. 2A, according to an exemplary embodiment of the present invention.

FIG. 2B shows the sub-pixel location of the point source 201, according to an exemplary embodiment of the present invention. As can be seen, each pixel is divided into a grid of 5×5 sub-pixels, and one can conclude that the point source 201 has been detected in the center-most sub-pixel location, based on the distribution of the energy values of each pixel. In an exemplary embodiment, the sub-pixel location can be determined based on a center of mass calculation on the energy value distribution shown in FIG. 2A.

Figure 2C:
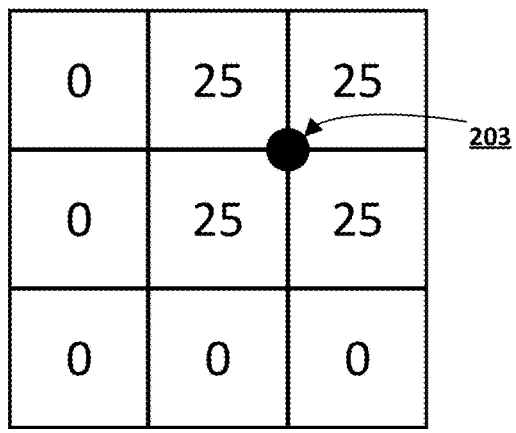
FIG. 2C shows an energy value distribution for a grid of nine pixels where a point source is observed at the junction of four pixels, according to an exemplary embodiment of the present invention.

FIG. 2C shows another energy value distribution for a grid of nine pixels, where a point source 203 is observed at the junction of four pixels, according to an exemplary embodiment of the present invention. In this particular embodiment, because the energy value distribution is equally balanced between four pixels, with a value of 25, and the other pixels within the grid have not detected any energy signatures, it can be concluded that the point source 203 has been detected at the junction between the four pixels in the upper right corner of the grid.

Figure 2D:
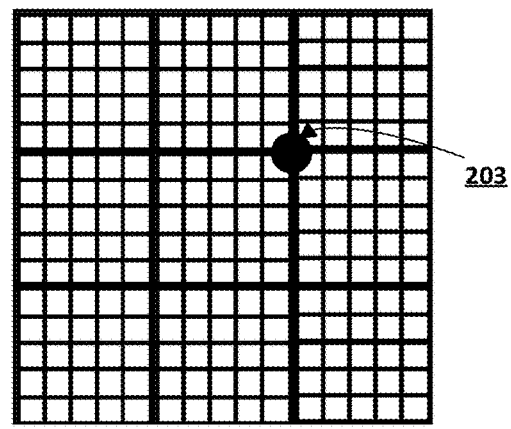
FIG. 2D shows the sub-pixel location of the point source of FIG. 2C, according to an exemplary embodiment of the present invention.

FIG. 2D shows the sub-pixel location of the point source 203, according to an exemplary embodiment of the present invention. As can be seen, each pixel is divided into a grid of 5×5 sub-pixels, and one can conclude that the point source 203 has been detected at the junction between four pixels, based on the equal distribution of energy values between those four pixels.

Figure 2E:
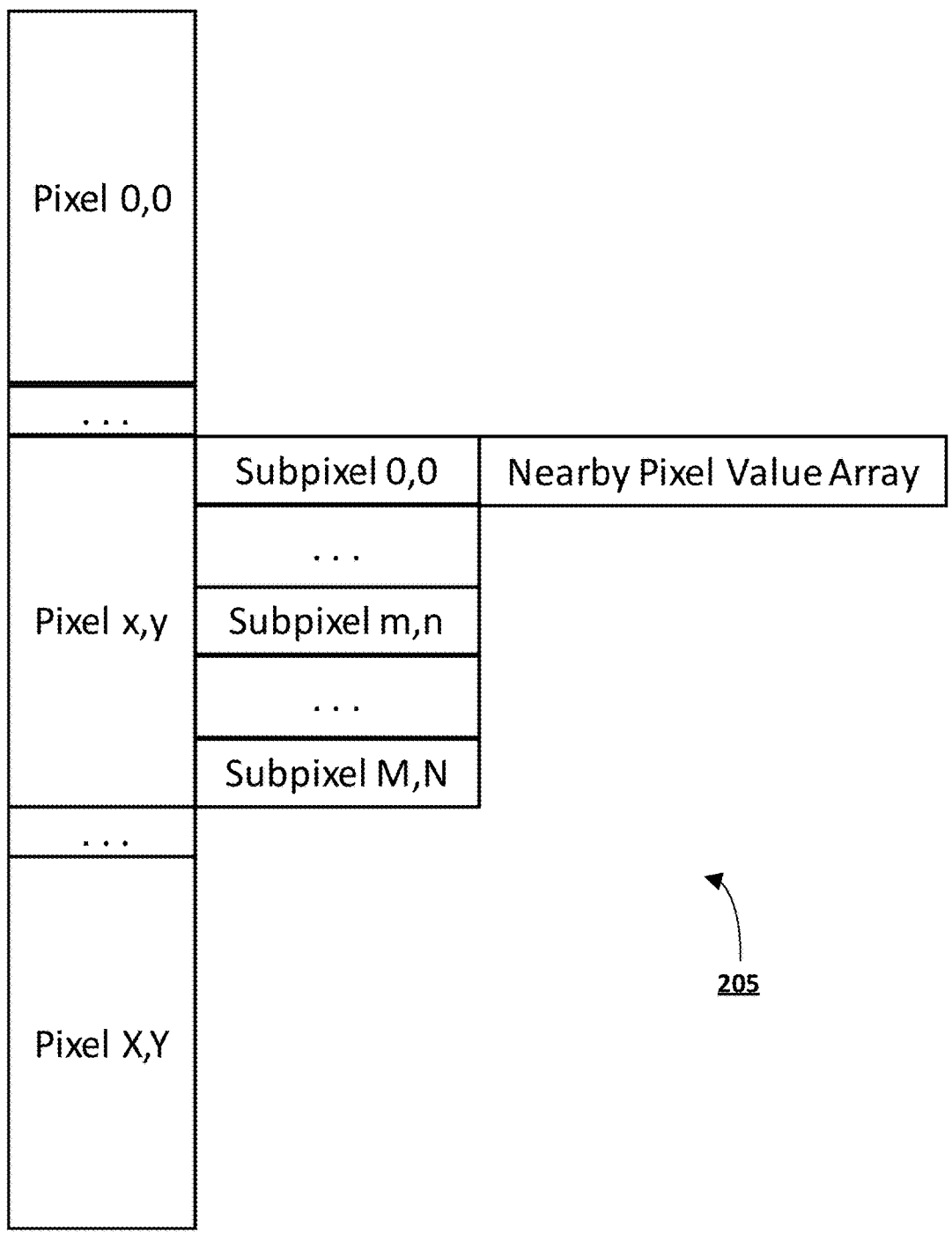
FIG. 2E is an exemplary database structure that can be used to record ideal intensity values for pixels and sub pixels from a test ideal point source signature.

FIG. 2E is an exemplary database structure 205 that can be used to record ideal intensity values for pixels and sub pixels from a test ideal point source signature, according to an exemplary embodiment of the present invention. In this particular embodiment, the FPA includes a grid of X-by-Y pixels can each be divided into a M×N grid of sub-pixels. As discussed above, the number of sub-pixels or the dimensions of the sub-pixel grid can be determined based on the desired accuracy of the system, and/or the amount of database memory available to the system. Each sub-pixel location (m,n) can be associated with a nearby pixel value array. In exemplary embodiments, the pixel and sub-pixel locations are used to index into the database structure and retrieve the expected intensity values of local pixels for a recorded ideal point source signature.

FIG. 3A shows an observed point source energy signature, according to an exemplary embodiment of the present invention. This figure shows an example image of a real point source target in a sensor. The following figure, FIG. 3B, shows the expected image value from an ideal point source. In this particular embodiment, the X and Y axes units are pixels and the image represents a 5×5 pixel subset of a FPA.

FIG. 3B shows an ideal point source energy signature at one sub-pixel location, according to an exemplary embodiment of the present invention. As discussed above, ideal point source data can be pre-recorded at various sub-pixel locations within a sensor FOV, and such data can be stored in a database or memory. The recording of point source data from various sub-pixel locations can be beneficial, because the energy values of adjacent pixels may be dependent upon the sub-pixel location of a point source. Observing the characteristics of the same point source in various pixels throughout the overall FOV is also beneficial, because the energy distribution in adjoining pixels can also be affected by the blur circle properties of the optics hardware. Because the energy signatures of FIG. 3A and FIG. 3B are very similar, it can be concluded that there is a high correlation between the observed source and a point source.

Figure 4:
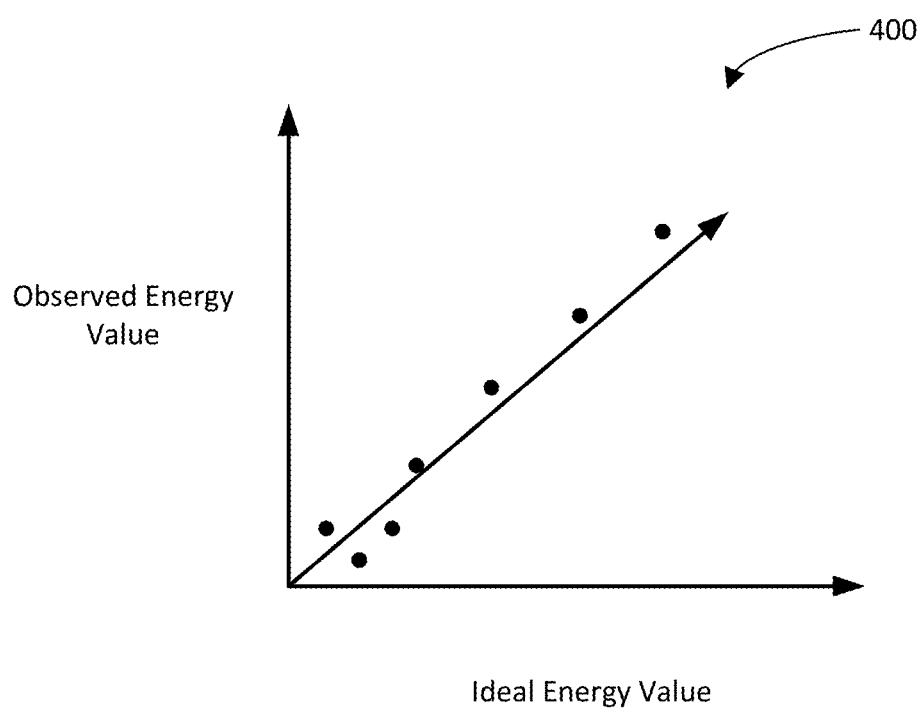
FIG. 4 is a graph of the observed energy value relative to the ideal energy value for pixels within a FOV, according to an exemplary embodiment of the present invention.

FIG. 4 is a graphical illustration 400 of the comparison of the observed energy values relative to the recorded ideal energy values for pixels within a sensor FOV, according to an exemplary embodiment of the present invention. As discussed above, once the observed energy value is plotted relative to the ideal energy value for pixels within the sensor FOV, a linear best-fit line may be applied to the plotted data. In alternative embodiments, an $R^2$ value, or coefficient of determination, can be computed for the plotted data. The slope of the linear best-fit curve, as well as the $R^2$ value, can be evaluated in order to determine any correlation between the observed data and the ideal point source signatures. In an exemplary embodiment, the observed and ideal signature comparison is performed by plotting the actual energy content from the observed signature in each relevant pixel relative to the recorded ideal energy content based on the pre-recorded signatures. In some embodiments, a slope of the linear best-fit curve that approaches one indicates a higher probability that the observed source is a point source since it indicates that the observed values and recorded values are close to matching. Similarly, a low $R^2$ value indicates a higher probability that the observed source is a point source. In exemplary embodiments, the $R^2$ value is a cross-correlation coefficient, which is a statistical value indicating to how well the observed or actual data corresponds to the ideal data.

Figure 5:
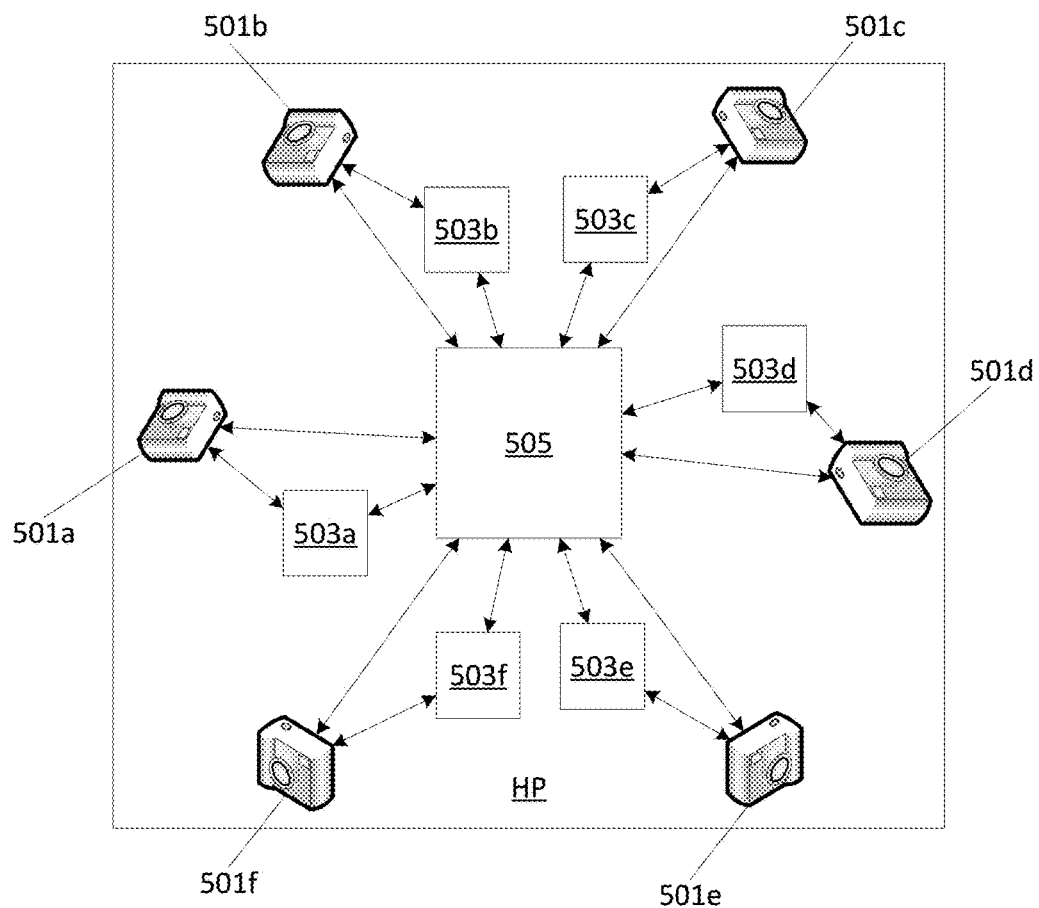
FIG. 5 is an example block diagram depicting various components which can be used to implement various embodiments of a distributed point source detection system.

FIG. 5 is an example imaging system block diagram of an exemplary on-board imaging system 500. The on-board imaging system 500 can be installed on a host platform HP. HP may be a helicopter, plane, drone or other airborne platform. HP may also be a non-airborne platform. The system 500 includes a plurality of image sensors 501*a-f* installed on the host platform HP, each of the image sensors 501*a-f* being in electronic communication with at least one processor 503*a-f*, 505 installed on the host platform HP. As shown in FIG. 5, each image sensor 501*a-f* may be in electronic communication with both a dedicated processor 503*a-f* and a central processor 505. However, it will be apparent in view of this disclosure that, in accordance with various embodiments, one or more of the image sensors 501*a-f* can connect only to a central processor 505. It will further be apparent in view of this disclosure that, in accordance with various embodiments, one or more of the image sensors 501*a-f* can connect only to a dedicated processor 503*a-f*, It will still further be apparent in view of this disclosure that any combination of sensors per processor or processors per sensor can be used in accordance with various embodiments.

Image sensors 501*a-f* can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 501*a-f*, in accordance with various embodiments can encompass any sensor configured to capture electromagnetic radiation in any spectrum for producing an image, including, for example, infrared radiation, visible light, ultraviolet radiation, x-rays, etc.

Dedicated processors 503*a-f* and central processor 505 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 503*a-f* can be a FPGA for providing temporary storage of a limited number of data captures acquired by the a corresponding image sensor 501*a-f* and a coarse initial analysis while the central processor 505 can be a microprocessor for conducting more detailed analysis as needed. In various embodiments, the central processor 505 can perform all processing functions, eliminating the need for dedicated processors 503*a-f*. In various embodiments, the dedicated processors 503a-f can perform all processing functions, eliminating the need for a central processor 505. It will be apparent in view of this disclosure that any other combinations and ratios of processors and image sensors can be used in accordance with various embodiments.

Figure 6:
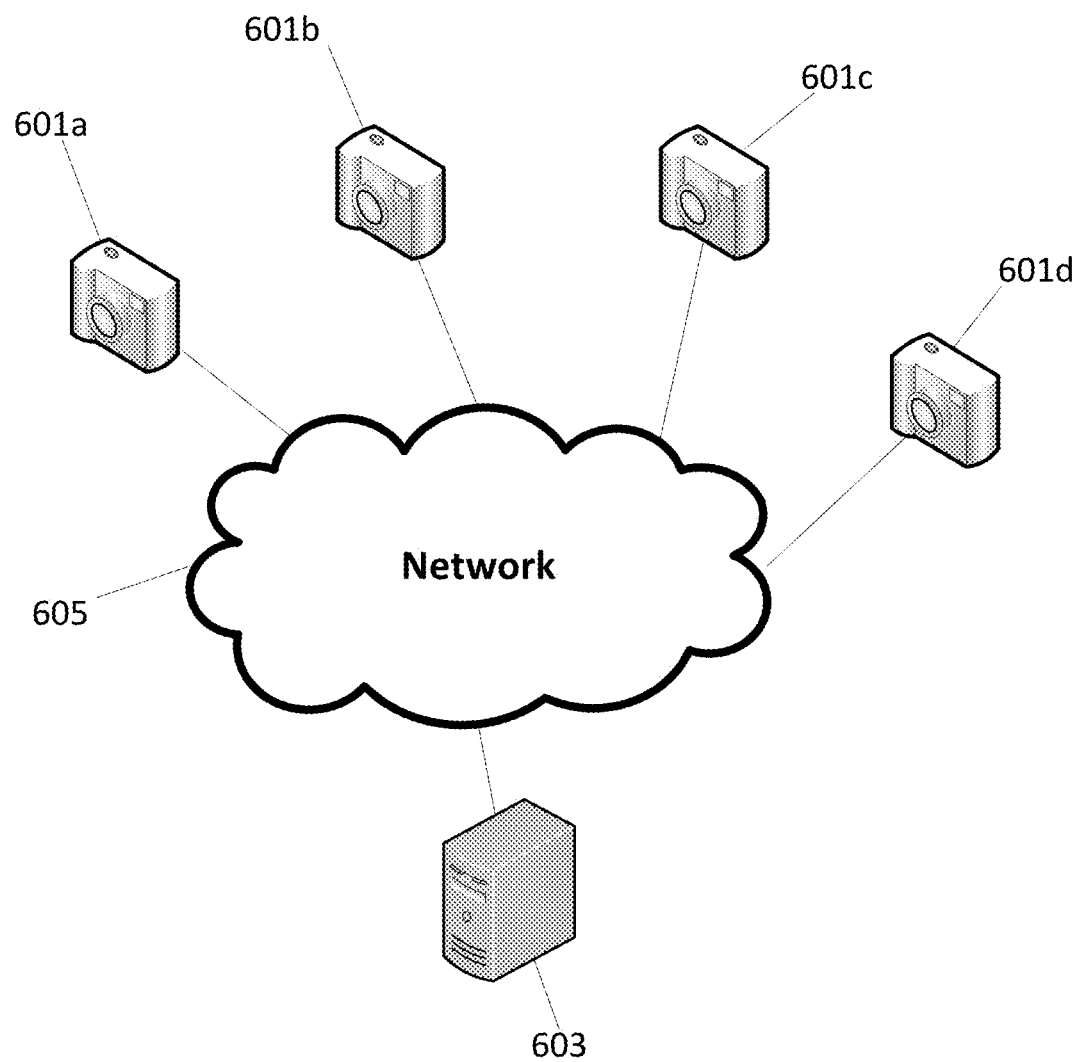
FIG. 6 is an example block diagram depicting various components which can be used to implement various embodiments in a distributed point source detection system.

FIG. 6 is an example imaging block diagram of certain distributed embodiments. Although FIG. 5 and portions of the exemplary discussion above make reference to a centralized system 500 operating with on one or more co-located image sensors and/or processors, one will recognize that various of the components and modules within the system 500 may instead be distributed across a network 605 in separately or remotely located image sensors 601a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 603 such as one or more server systems, desktop computer devices, mobile computer devices, field-programmable gate arrays, microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 601a-d can be received by the remote processing system(s) 603 for frame registration and comparison. In some embodiments, the remote processing system(s) 603 can provide feedback to one or more of the image sensors 601a-d based on the frame registration and comparison. In some distributed remote imaging systems, the image sensors 601a-d and processing systems 603 of the system 100, 500 can be separately located and can be in communication with one another across the network 605.

Figure 7:
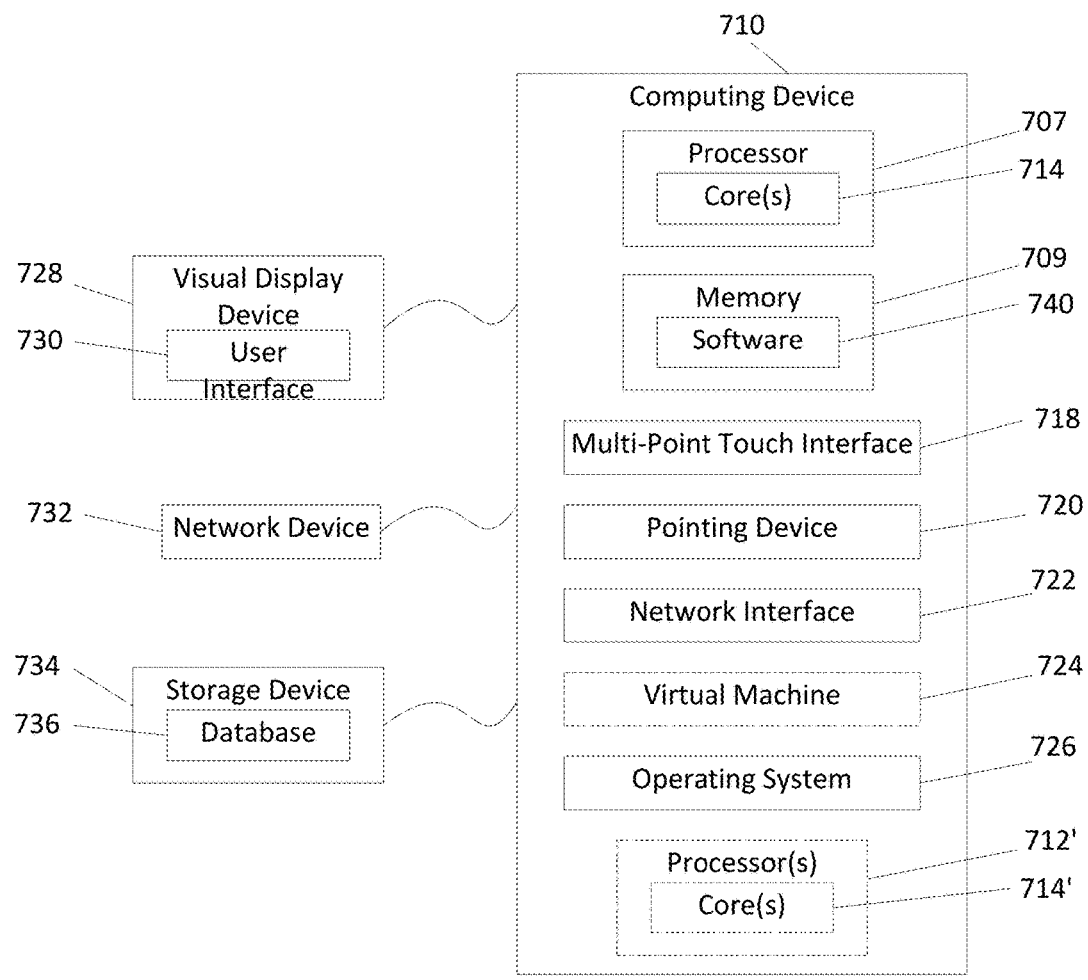
FIG. 7 is an example computational device block diagram depicting various components which can be used to implement an embodiment of a point source detection system.

FIG. 7 is a block diagram of an exemplary computing device 710 such as can be used, or portions thereof, in accordance with various embodiments. For example, computing device 710 may be located in a helicopter, airplane, drone or other platform and perform detection of point source objects as described herein. The computing device 710 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 709 included in the computing device 710 can store computer-readable and computer-executable instructions or software for performing the operations disclosed herein. For example, the memory 709 can store a software application 740 which is configured to perform various of the disclosed operations (e.g., generating a plurality of user interface elements based on the quantities of data stored in the memory 709). The computing device 710 can also include configurable and/or programmable processor 707 and an associated core 714, and optionally, one or more additional configurable and/or programmable processing devices, e.g., processor(s) 712' and associated core(s) 714' (for example, in the case of computational devices having multiple processors/cores), for executing computer-readable and computer-executable instructions or software stored in the memory 709 and other programs for controlling system hardware. Processor 707 and processor(s) 712' can each be a single core processor or multiple core (714 and 714') processor. In some embodiments, processor 707 and processor(s) 712' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 710 so that infrastructure and resources in the computing device can be shared dynamically. A virtual machine 724 can be provided to handle a process running on multiple processors so that the process appears to be using only one computing resource rather than multiple computing resources. Multiple virtual machines can also be used with one processor.

Memory 709 can include a computational device memory or random access memory, such as DRAM, SRAM, EDO RAM, and the like. Memory 709 can also include, for example, flip-flops, memory blocks, RAM blocks, programmable read-only memory, and the like. Memory 109 can include other types of memory as well or combinations thereof.

A user can interact with the computing device 710 through a visual display device 728, such as a computer monitor, which can display one or more user interfaces 730 that can be provided in accordance with exemplary embodiments. The computing device 710 can include other I/O devices for receiving input from a user, for example, a keyboard or any suitable multi-point touch interface 718, or a pointing device 720 (e.g., a mouse). The keyboard 718 and the pointing device 720 can be coupled to the visual display device 728. The computing device 710 can include other suitable conventional I/O peripherals.

The computing device 710 can also include one or more storage devices 734, such as a hard-drive, CD-ROM, or other computer readable media, for storing data and computer-readable instructions and/or software that perform operations disclosed herein. Exemplary storage device 734 can also store one or more databases 736 for storing any suitable information required to implement exemplary embodiments. The databases 736 can be updated manually or automatically at any suitable time to add, delete, and/or update one or more items in the databases. For example, database 736 may hold ideal signature and energy values for pixel and sub-pixel locations in image data that are pre-recorded as a test source moves through a FOV of one or more sensors in the FPA as described herein.

The computing device 710 can include a network interface 722 configured to interface via one or more network devices 732 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 722 can include a built-in network adapter, network interface card, PCMCIA network card, card bus network adapter, wireless network adapter, USB network adapter, modem or any other device suitable for interfacing the computing device 710 to any type of network capable of communication and performing the operations described herein. Moreover, the computing device 710 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 710 can run any operating system 726, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 726 can be run in native mode or emulated mode. In an exemplary embodiment, the operating system 726 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method for identifying a point source energy signature the method comprising:
    wherein the point source energy signature is smaller than a single pixel;
    using a point source detection system, the point source detection system, comprising;
        at least one optical sensor having a field of view, the optical sensor comprising a focal plane array;
    executing instructions stored on one or more non-transitory machine-readable mediums by one or more processors for
    obtaining one or more ideal test point source signatures by:
        moving one or more ideal test point sources through the field of view of the sensor to each pixel and sub-pixel location within the field of view;
        receiving, via the focal plane array, the one or more ideal test point source energy signatures corresponding to a plurality of sub-pixel locations within one or more pixels of image data generated from within the field of view of the sensor, where the one or more ideal test point source energy signatures corresponds to the one or more ideal test point sources;
    calculating, via the one or more processors, an ideal energy value for each of the plurality of sub-pixels within the field of view of the sensor for each of the one or more ideal test point sources, based on an intensity value of the ideal test point source energy signatures at the plurality of sub-pixel locations; and
    storing, via memory, the ideal energy value comprising normalized intensity data for each of the plurality of sub-pixels any surrounding pixels within the field of view of the sensor for each of the one or more ideal test point sources as stored ideal energy values for each of the plurality of sub-pixels;
    receiving, via the focal plane array, an observed energy signature within one or more pixels;
    calculating, via the one or more processors, an observed energy value for the one or more pixels at the sub-pixel level based on the observed energy signature;
    determining, via the one or more processors, a sub-pixel location for the observed energy signature within the one or more pixels;
    comparing, via the one or more processors, the observed energy value for the one or more pixels at the sub-pixel level against a stored ideal energy value for a sub-pixel location that corresponds to the determined sub-pixel location for the observed energy signature within the one or more pixels;
    determining, via the one or more processors, whether the observed energy signature correlates to a point source based on the comparison of the observed energy value for the one or more pixels at the sub-pixel level against the stored ideal energy value for the sub-pixel location that corresponds to the determined sub-pixel location for the observed energy signature within the one or more pixels minimize false detections caused by optical blurring; and
    displaying, via a visual display device, when the observed energy signature is the point source energy signature of a point source, wherein the point source is a launched ordnance as part of a threat deter on system.

2. The method of claim 1, further comprising plotting the observed energy value against the ideal energy value corresponding to the sub-pixel location of the observed energy signature.

3. The method of claim 2, further comprising determining that the observed energy signature corresponds to a point source if a linear best-fit curve applied to the plot of the observed energy value has a slope with a pre-specified value approaching one.

4. The method of claim 1, wherein when the one or more ideal test point source energy signatures is detected within a first sub-pixel location it alters an ideal energy value of an adjacent pixel at the sub-pixel level.

5. The method of claim 1, wherein the ideal and observed energy values are calculated using a non-Gaussian point spread function.

6. The method of claim 1, wherein the sensor is part of an airborne host platform, the airborne host platform being one of a fixed wing airplane, a helicopter, or a drone, the at least one sensor being configured to capture electromagnetic radiation in any spectrum for producing an image.

7. A system for identifying a point source energy signature, the system comprising:
wherein a point source energy signature is smaller than a single pixel,
at least one optical sensor having a field of view, the optical sensor comprising a focal plane array configured to:
receive one or more ideal test point source energy signatures corresponding to a plurality of sub-pixel locations in one or more pixels of image data generated from within the field of view of the sensor, where the one or more ideal test point source energy signatures correspond to one or more ideal test point sources; and
receive an observed energy signature within the one or more pixels at the sub-pixel level; and
one or more processors in electrical communication with the sensor configured to:
calculate an ideal energy value for each of the plurality of sub-pixels within the field of view of the sensor for each of the one or more ideal test point sources, based on an intensity value of the one or more ideal test point source energy signatures at the plurality of sub-pixel locations;
calculate an observed energy value for the one or more pixels at the sub-pixel level based on the observed energy signature;
determine a sub-pixel location for the observed energy signature within the one or more pixels;
compare the observed energy value for the one or more pixels at the sub-pixel level against a stored ideal energy value for a sub-pixel location that corresponds to the determined sub-pixel location for the observed energy signature within the one or more pixels of the sensor; and
determine whether the observed energy signature correlates to a point source based on the comparison of the observed energy value for the one or more pixels at the sub-pixel level against the stored ideal energy value for the sub-pixel location that corresponds to the determined sub-pixel location for the observed energy signature within the one or more pixels to minimize false detections caused by optical blurring;
a memory device configured to:
store the one or more ideal test point source energy signatures including sub-pixel blur resulting from the one or more ideal test point sources; and
a visual display device configured to:
display when the observed energy signature is the point source energy signature of a point source, wherein the point source is a launched ordnance as part of a threat detection system.

8. The system of claim 7, wherein the one or more processors are further configured to plot the observed energy value against the ideal energy value corresponding to the sub-pixel location of the observed energy signature.

9. The system of claim 8, wherein the one or more processors are further configured to determine that the observed energy signature corresponds to a point source if a linear best-fit curve applied to the plot of the observed energy value has a slope with a pre-specified value approaching one.

10. The system of claim 7, wherein when the one or more ideal test point source energy signatures is detected within a first sub-pixel location it alters an ideal energy value of an adjacent pixel at the sub-pixel level.

11. The system of claim 7, wherein the ideal and observed energy values are calculated using a non-Gaussian point spread function.

12. The system of claim 7, wherein the sensor is part of an airborne host platform, the airborne host platform being one of a fixed wing airplane, a helicopter, or a drone, the at least one sensor being configured to capture electromagnetic radiation in any spectrum for producing an image.

13. A non-transitory computer readable medium storing instructions executable by a processing device of a point source detection system within a threat detection system, the instructions implementing a method for identifying a point source energy signature of a launched ordnance, wherein execution of the instructions causes the processing device to:
obtain one or more ideal test source signatures by:
receiving, via a focal plane array, the one or more ideal test point source energy signatures corresponding to a plurality of sub-pixel locations in one or more pixels of image data generated from within a field of view of at least one sensor wherein the processing device is in electrical communication with the sensor, where the one or more ideal test point source energy signatures correspond to one or more ideal test point sources and the sensor is part of an airborne host platform, the airborne host platform being one of a fixed wing airplane, a helicopter, or a drone;
calculating an ideal energy value for each of the plurality of sub-pixels within the field of view of the sensor for each of the one or more ideal test point sources, based on an intensity value of the one or more ideal test point source energy signatures at the plurality of sub-pixel locations; and
storing, in memory, the ideal energy value comprising normalized intensity data for each of the plurality of sub-pixels within the field of view of the sensor for each of the one or more ideal test point sources;
receive, via the focal plane array, an observed energy signature within the one or more pixels at the sub-pixel level;
calculate an observed energy value for the one or more pixels at the sub-pixel level based on the observed energy signature;
determine a sub-pixel location for the observed energy signature within the one or more pixels;
compare the observed energy value for the one or more pixels at the sub-pixel level against a stored ideal energy value for a sub-pixel location that corresponds to the determined sub-pixel location for the observed energy signature within the one or more pixels of the sensor;
determine whether the observed energy signature correlates to a launched ordnance based on the comparison of the observed energy value for the one or more pixels at the sub-pixel level against the stored ideal energy value for the sub-pixel location that corresponds to the determined sub-pixel location for the observed energy signature within the one or more pixels to minimize false detections caused by optical blurring; and
display, via a visual display device, when the observed energy signature is the point source energy signature of a launched ordnance, the visual display being in electrical communication with the processing device.

14. The non-transitory computer readable medium of claim 13, wherein execution of the instructions further causes the processing device to plot the observed energy value against the ideal energy value corresponding to the sub-pixel location of the observed energy signature.

15. The non-transitory computer readable medium of claim 14, wherein execution of the instructions further causes the processing device to determine that the observed energy signature corresponds to a launched ordnance if a linear best-fit curve applied to the plot of the observed energy value has a slope with a pre-specified value approaching one.

16. The non-transitory computer readable medium of claim 13, wherein when one or more ideal test point source energy signatures is detected within a first sub-pixel location it alters an ideal energy value of an adjacent pixel at the sub-pixel level.

17. The non-transitory computer readable medium of claim 13, wherein the ideal and observed energy values are calculated using a non-Gaussian point spread function.

* * * * *